(No Model.)

C. E. MARK.
HOSE COUPLING.

No. 314,699. Patented Mar. 31, 1885.

Attest:
A. Barthel

Inventor:
Charlie Edgar Mark
by his Att'y

UNITED STATES PATENT OFFICE.

CHARLIE EDGAR MARK, OF FLINT, MICHIGAN.

HOSE-COUPLING.

SPECIFICATION forming part of Letters Patent No. 314,699, dated March 31, 1885.

Application filed December 10, 1884. (No model.)

*To all whom it may concern:*

Be it known that I, CHARLIE E. MARK, of Flint, in the county of Genesee and State of Michigan, have invented new and useful Improvements in Hose-Couplings; and I do hereby declare that the following is a full, clear, and exact description thereof, reference being had to the accompanying drawings, which form a part of this specification.

This invention relates to certain new and useful improvements in the construction of automatic or self-acting hose-couplings for coupling flexible hose, such as is employed upon railway-cars for air or steam brakes. The invention is especially designed to be an improvement upon the device for a similar purpose for which I made application for Letters Patent of the United States by my petition signed on the 17th day of June, 1884.

The invention consists in some improvements in the method of construction, so that under certain circumstances a more certain result will be obtained, as more fully hereinafter explained.

Figure 1:
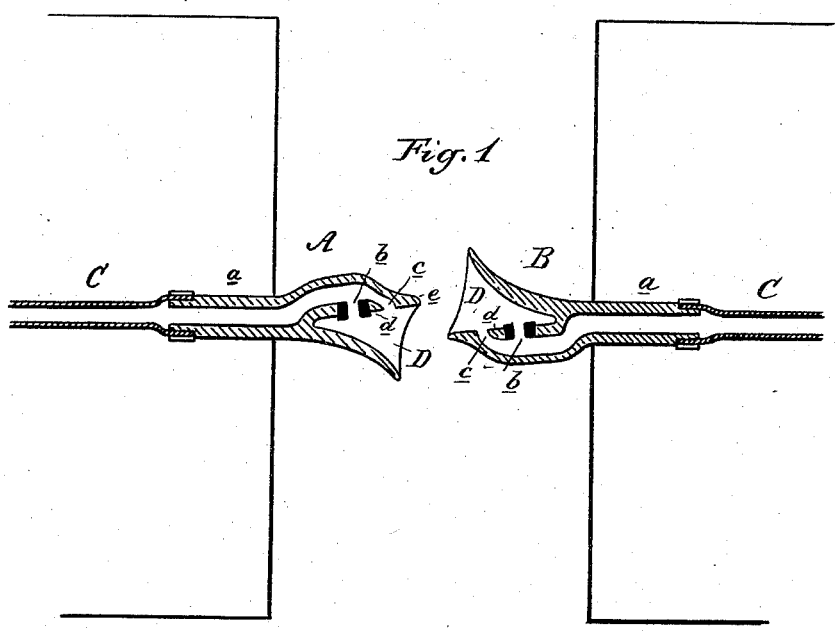
Figure 2:
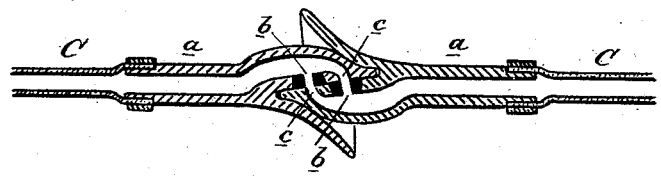
Figure 3:
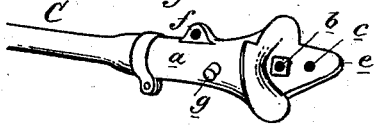

Figure 1 shows a pair of my improved hose-couplings in central horizontal section. Fig. 2 is a like view showing the parts engaged. Fig. 3 is a perspective view of one of the parts.

In the accompanying drawings, which form a part of this specification, A represents one of my improved couplings, and B represents another, the two forming a pair. *a* is a tube or pipe having means for being secured to the hose C. The bore of this tube is partially straight and partially curved, as shown, and from this curved portion of such bore there are two openings, *b* and *c*, through the sloping wall *d*, which otherwise would close that end of the tube. The extreme end of this wall terminates in a finger, *e*, which guides the tubular part of the device into the flaring mouth D. The opening *b* is provided with a rubber packing projecting a little beyond the outer face of the wall. The two parts A and B are alike in their construction, and are so constructed that when they are engaged, as shown in Fig. 2, the rubber packing of the opening in one of the walls engages with the non-bushed opening in the other wall, and vice versa, so that in both couplings, when the parts are engaged, two tight passages will extend from one part to the other of the coupling, allowing a free passage of air or steam, as desired. Each part is provided with an ear, *f*, and studs *g*, whereby it may be suspended from the car to which it may be applied by suitable links or other connections.

The advantages of the two holes in the coupling instead of one, as in my patent before referred to, are: It enables the rubber bushing to face metal on the opposite part of the coupling, thereby not causing so much wear on the rubber, whereas in the former construction the hole in each coupling is bushed with rubber, which has a tendency to keep them from slipping to their place, and the result is an imperfect joint. Besides, I am able to pass more air than in my former construction, on account of the shape necessary for the formation of the coupler. Moreover, the openings being placed farther back in the mouth gives a more positive joint.

What I claim as my invention is—

1. A two-part hose-coupling, each part being a counterpart of the other, and each having two communicating passages, one of which is provided with a rubber bushing, while the other is unprovided with such bushing, substantially as described.

2. The combination, in a two-part hose-coupling having each a curved passage, of a sloping division-wall, which forms one side of such passage, and having two openings therein, one of which is provided with a rubber bushing, and adapted, when the two parts are engaged, to bring the bushed opening in one part into coincidence with the unbushed opening of the other part, substantially as specified.

CHARLIE EDGAR MARK.

Witnesses:
 H. S. SPRAGUE,
 CHARLES J. HUNT.